May 8, 1934.  R. O. HAMILL  1,957,498
AUTOMATIC SERVICE DISCONNECTER
Filed Oct. 30, 1930   3 Sheets-Sheet 1
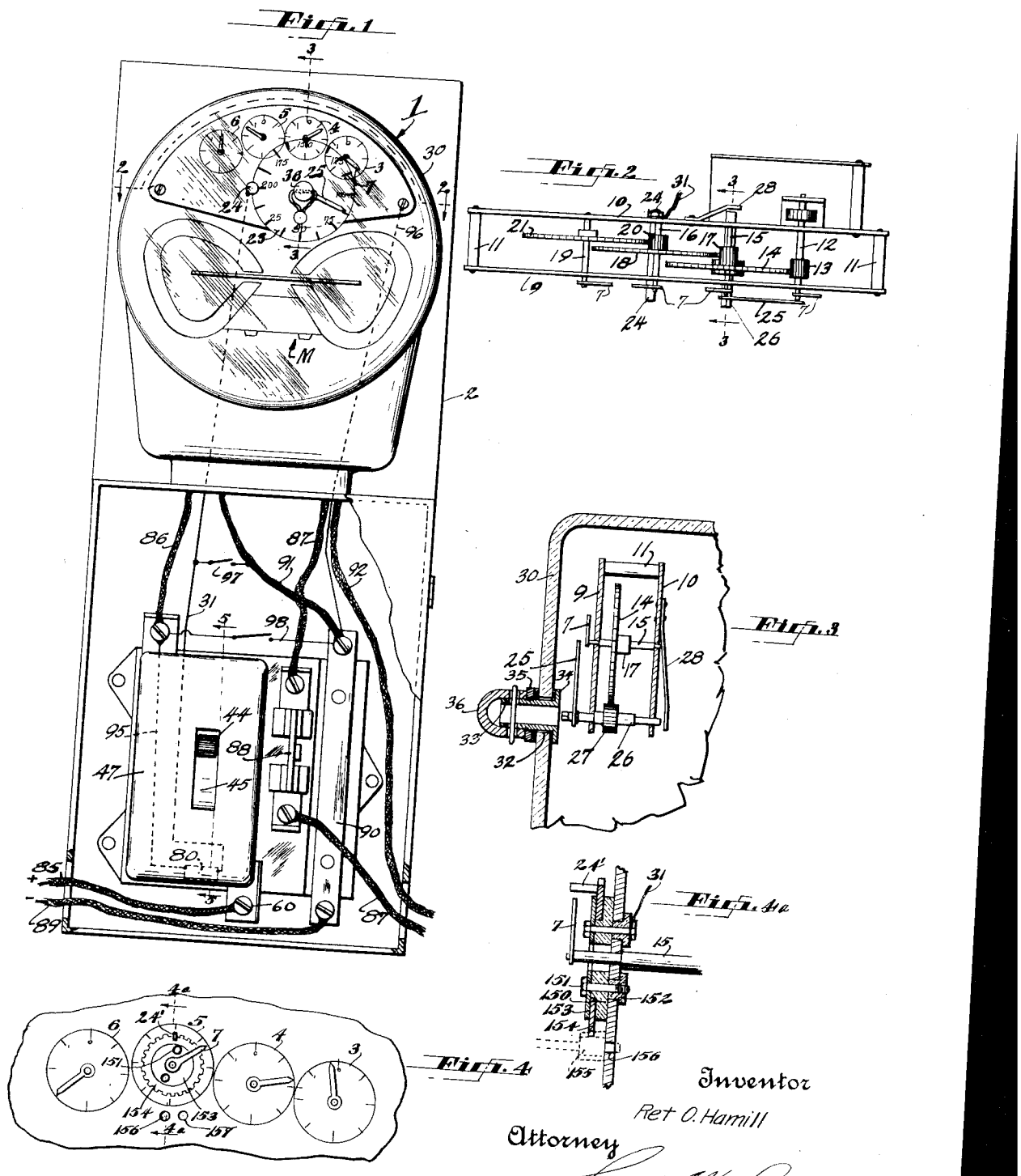

May 8, 1934.  R. O. HAMILL  1,957,498
AUTOMATIC SERVICE DISCONNECTER
Filed Oct. 30, 1930  3 Sheets-Sheet 2
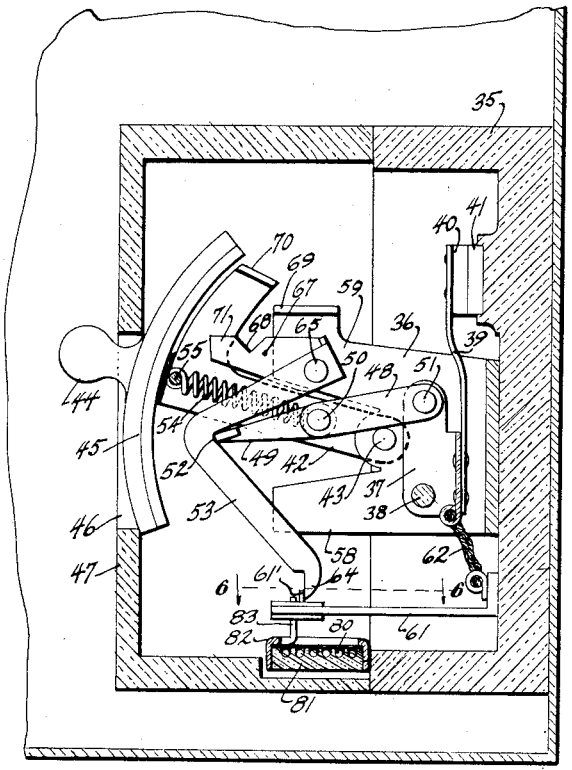
Fig. 5
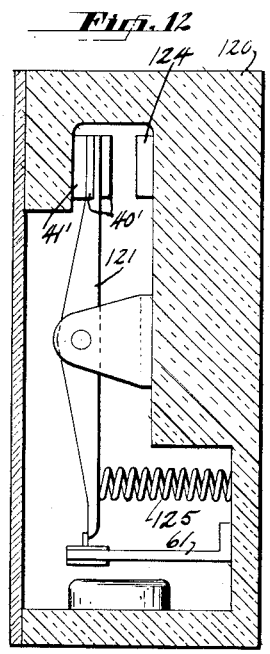
Fig. 12
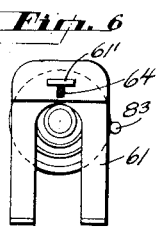
Fig. 6
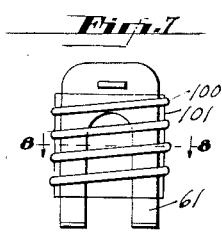
Fig. 7
Fig. 8
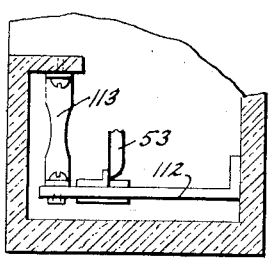
Fig. 11
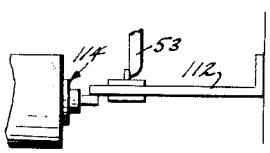
Fig. 11a
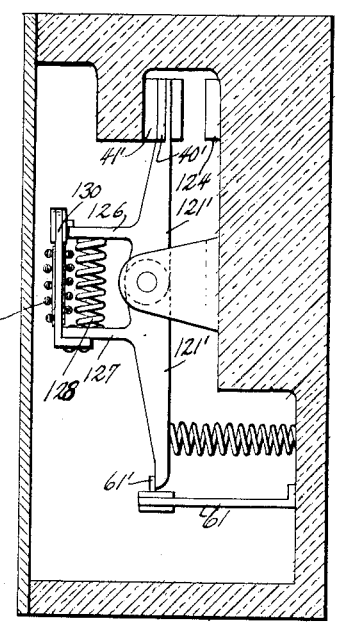
Fig. 12a
Inventor
R. O. Hamill
Attorney
Edward W. Hathaway May 8, 1934. R. O. HAMILL 1,957,498
AUTOMATIC SERVICE DISCONNECTER
Filed Oct. 30, 1930   3 Sheets-Sheet 3
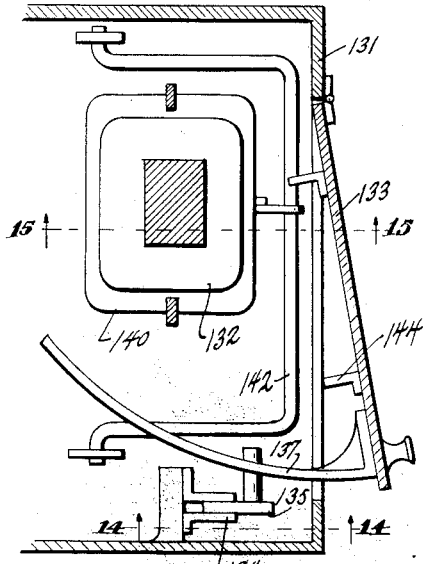
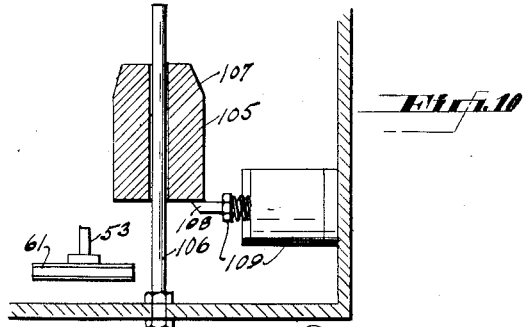
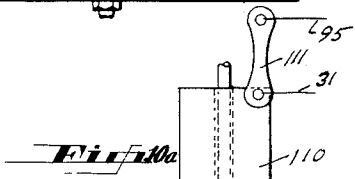
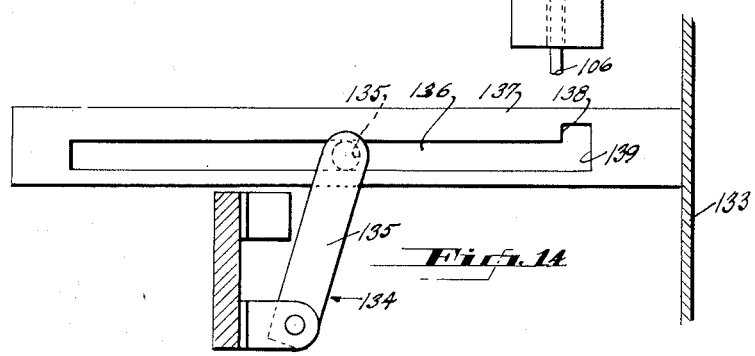
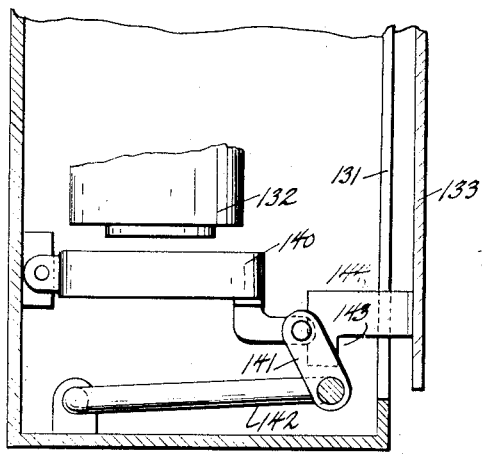
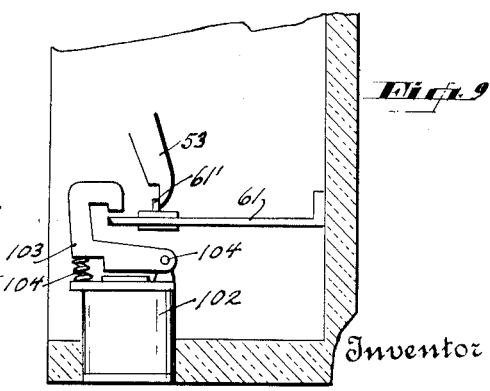
Inventor
Ret O. Hamill
Attorney

UNITED STATES PATENT OFFICE 1,957,498

AUTOMATIC SERVICE DISCONNECTER

Ret O. Hamill, Brooklyn, N. Y.

Application October 30, 1930, Serial No. 492,291

13 Claims. (Cl. 171—34)

This invention relates generally to an improved method and apparatus for automatically disconnecting an electrical circuit, and more particularly for automatically disconnecting the service wires of a circuit metered with an integrating watthour meter.

When electric current has been supplied to customers, difficulty is sometimes had in collecting bills for the current used. If a customer does not pay his bill within a certain time it is usual to disconnect his service, but obstacles are sometimes encountered in an attempt to gain access to the meter to do this. Such difficulty is experienced usually with customers who are habitual delinquents because knowing that their service will be cut off they take extra pains to see that every impediment possible is put in the way of the service man so as to prevent him from disconnecting the service.

An object of my invention is to provide an improved method and apparatus for automatically disconnecting a customer when he has used a given amount of unpaid-for current, and to include in this improved means, if desired, an arrangement whereby the customer himself may see just how much current he can use before it is shut off, thereby offering some incentive to cause an immediate payment of his bill. This is preferably supplemented by a notice on the bill that a certain amount of current can only be used before the service is automatically disconnected. If means are employed whereby the customer can see how much current can be used before being disconnected it is desirable to have the equipment so arranged and constructed that he cannot prevent the automatic disconnection.

In one aspect of the invention it is an object to provide an improved combination having an integrating watt hour meter, mechanism controlled thereby for determining the quantity of current to be used, circuit opening and closing means whose opening operation is adapted to be initiated by said mechanism and when once initiated will completely open by itself, and means whereby said mechanism may be reset without in any way affecting the meter reading or of causing the circuit to be reestablished. The function of not being able to reestablish the circuit until the circuit breaker is manually closed provides a means whereby the meter may be kept inoperative during the resetting operation thereby avoiding possible injury to the delicate meter mechanism such injury being possible if the manual resetting operation occurred while the meter was running. The function of having the switch automatically complete its opening operation after it is once initiated is also particularly useful where the control operations are effected by an integrating watt hour meter because it necessitates only an instantaneous control operation by the meter thereby relieving its small clock-like parts of the necessity of maintaining a constant positive control. This desirable result is fully completed in another aspect of the invention by having the initiating or quantity determining means become inoperative when the circuit breaker opens. To compensate for the lack of a constant positive control the arrangement is further adapted upon any unwarranted attempt to reclose the circuit to cause said initiating means to be rendered operative thereby defeating reclosure of the switch whereupon the initiating means again becomes inoperative. This cycle of events is repeated on each attempted reclosure. It will be seen from the specific disclosures herein that the initiating means may, if desired, be made constantly operative, after once being brought into operation, by connecting the circuit therefor to the constantly live service wires instead of the live meter wire which is dead when the service is automatically disconnected. This arrangement retains certain of the advantages of the previously described arrangement.

In a more specific aspect of the invention I provide as one element thereof a circuit breaker of any suitable or desirable type adapted to open the service wires automatically upon occurrence of, say, an overload, the circuit breaker functioning preferably in such a manner that while it may be manually manipulated in an attempt to reclose the circuit, still it may not be reclosed to establish a service connection as long as the overload condition exists. This circuit breaker could of course be of the type which opens on low voltage or other abnormal conditions. Cooperating with this circuit breaker is the watt hour meter and the means controlled thereby for initiating operation of the circuit breaker when a predetermined amount of current is used. These elements cooperate in such a manner that characteristics of the circuit breaker become characteristics of the automatic service disconnecter, and while they are therefor functionally related and dependent structurally yet they are so coordinated as to avoid interference between the overload and service disconnecting operations.

In the preferred specific aspect of the invention I employ a circuit breaker of a type having releasable mechanism in the form of a thermostatically operated latch so arranged that a portion of the whole of the service current passes through the thermostat which upon being heated by an excessive or overload current will move so as to release the latch whereupon the circuit breaker will open. To operate this circuit breaker when a predetermined quantity of current has been used I provide means for initiating operation of various types of improved electrically controlled means for effecting release of the releasable means or latch mechanism. In the preferred form suitable means are provided for automatically supplementing the heating of the thermocouple when a predetermined amount of current has been used, thereby automatically opening the circuit breaker to disconnect the service. This supplemental means is connected to the wires on the meter side of the circuit breaker thereby rendering the supplemental means inoperative when its purpose is performed but if any attempt is made to reclose the circuit breaker, prior to resetting of the means which determines the quantity of current to be used, then the supplemental means will be instantly reenergized upon closure of the circuit breaker and thereby cause the breaker to be tripped. If desired the current which would be used for the supplemental means may instead be passed directly through the thermostat thereby sufficiently additionally heating the thermostat to make it unlatch the circuit breaker.

While a thermostat is preferably employed, it will, of course be understood that its broad function of releasing the breaker can be performed in certain of the modifications herein by a plain latch mechanism which is unlatched automatically when the given amount of current is used. Such latch mechanism can employ a latch element controlled by a fusible link, relay, solenoid or other suitable devices, it being readily seen from the disclosure herein that the relay armature can be provided with a suitable clip under which the releasable member of the circuit breaker may be latched whereby actuation of the relay armature or solenoid core will directly release the latch. In these cases the circuit breaker may not be adapted for its overload operation in which event the usual fuses are relied upon for overload safety.

Other objects are to provide an improved arrangement whereby the measuring or initiating means may be adjusted and an improved seal therefor, and where certain types of relays are used, to provide improved means for controlling the door of a meter pan in which the relay is disposed so as to cause the door to be fully closed before the service is connected whereby upon disconnection of the service the door may be automatically locked.

Other objects and advantages will be more readily apparent to those skilled in the art from the following description of the accompanying drawings in which Fig. 1 is a front elevation of an integrating watthour meter and meter pan showing wiring connections and the circuit breaker disposed within the pan, the meter being mounted vertically.

Fig. 2 is a horizontal section taken on line 2—2 of Fig. 1 and showing the gear-train which actuates the meter dial hands.

Fig. 3 is a vertical transverse section taken on line 3—3 of Figs. 1 and 2 showing in addition the sealing arrangement through which access may be had to the measuring mechanism for resetting the same.

Fig. 4 is a front elevation of a meter dial showing a modified form of measuring mechanism.

Fig. 4a is a vertical transverse section taken on line 4a—4a of Fig. 4.

Fig. 5 is a vertical section through one form of overload circuit controller in combination with means for actuating the same under conditions other than overload.

Fig. 6 is a horizontal section taken on line 6—6 of Fig. 5 and showing means for supplementing the heating of the thermostat which is specifically used in the above type of controller to effect opening of the circuit upon overload.

Fig. 7 is a modified arrangement of this supplementary heating arrangement.

Fig. 8 is a transverse section on line 8—8 of Fig. 7.

Fig. 9 is a vertical section through a thermocouple adapted to be released by supplementary means in the form of a solenoid or relay coil and armature.

Fig. 10 is a vertical section of a further modification for releasing the latch mechanism by a weight or other constrained force which is released by an electromagnetic element.

Fig. 10a is a modification similar to that shown in Fig. 10 with the weight held in suspended position by a fusible link.

Fig. 11 is another modification showing a yieldable latch member held in a latched position by a fusible element.

Fig. 11a is a modification similar to Fig. 11 but showing the latch spring held by a solenoid or electromagnet bar.

Fig. 12 is a modified form of switch.

Fig. 12a is a modification of the switch shown in Fig. 12.

Fig. 13 is a modification showing a relay switch with improved means for insuring locking of the meter-pan door upon automatic disconnection of the service.

Fig. 14 is a vertical section taken on line 14—14 of Fig. 13 and showing means for insuring closure of the meter-pan door before the service can be had.

Fig. 15 is a detailed vertical section showing improved means for locking the door.

In the illustrated embodiment of my invention I employ preferably an integrating watthour meter generally indicated at 1 although various other types of instruments may be employed under particular conditions or with certain phases of my improved arrangement. However, all of the advantages of this invention cannot be obtained without the cooperation of a suitable type of wattmeter. Hence the metering gears and dials will be specifically described in connection with my improved current measuring means which acts as means for initiating operation of the circuit controller when a given amount of current is used. The meter is disposed in the upper part of the meter pan generally indicated at 2, in the lower portion of which the circuit breaker and control switches are disposed. The meter itself comprises a series of dials 3, 4, 5 and 6, representing respectively tens, hundreds, thousands and ten thousands kilowatts, the indicating hands for which are indicated at 7. Each hand is mounted upon its own shaft which is journaled in front and back plates 9 and 10 rigidly secured together as by bolts 11. The first shaft 12 carrying a hand 7 is actuated through usual gearing from the usual motor (not shown) for a meter of this type. This shaft carries a pinion 13 meshing with a gear 14 which is secured to hand shaft 15, this shaft in turn driving shaft 16 as by a pinion 17 and gear 18 whereby shaft 16 drives shaft 19 by a pinion 20 and gear 21, the various gears being secured to their respective shafts.

To provide means for measuring a predetermined amount of current and to close a circuit when this amount is used there is provided a dial 23 preferably on the front of the frame 9. This dial is graduated, in either dollars and cents or kilowatts, in counterclockwise direction, starting from a contact pin 24. A hand 25 is secured to an axially movable shaft 26 which is disposed preferably below the shaft 15 of the hundredths dial and a gear 27 secured to this shaft meshes with the large "hundreds" gear 14, Fig. 3. The ratio between gears 14 and 27 is such as to cooperate with the graduations of dial 23 and may be changed depending upon what value of current is desired in which case either the original dial face 23 can be used with due consideration given to the graduations thereof during adjustments or a new dial may be provided. Shaft 26 is held in a forward position by a leaf-spring 28 which preferably is normally slightly spaced from the end thereof to avoid excessive friction during operation of the meter. The outer end of shaft 15 is square or of any other suitable shape for receiving a key which may be inserted through a suitable opening in the usual glass cover 30 of the meter. By inserting the key on the end of shaft 26 and pressing the same inwardly gear 27 may be moved out of mesh with gear 14 thereby permitting roation of shaft 26 and hand 25 independently and without in any way disturbing the meter mechanism or reading. If the customer has paid his bill the meter man will have instructions to reset hand 25 in a counterclockwise direction to some reading on dial 23 which will permit a given amount of current to be used before hand 25 will travel around and engage contact 24. This contact is suitably supported by and insulated from the front and back plates 9 and 10 whereby a wire 31 may be connected to the rear end of contact pin 24.

The opening through cover 30 comprises a single hole 32 through which is passed a hollow bushing 33 having an inner flange 34 and preferably a partially externally threaded outer end to receive a nut 35. Felt washers are preferably inserted adjacent the glass cover on each side thereof whereby the nut 35 may securely tighten the bushing within opening 32 without danger of cracking the glass cover. The bore of this bushing constitutes the opening through which the resetting key passes. To seal this passage a small cap 36 is slipped onto the end of bushing 33 and a sealing wire passed through suitable alined opening in the cap and bushing. This arrangement provides a simple means for sealing the instrument in that only a single opening through the glass cover need be provided.

To automatically disconnect the service when a given amount of current has been used and to permit, if desired, automatic breaking of the circuit due to some abnormal electrical condition in the circuit, such, for example, as an overload, I provide an improved arrangement of elements so functionally related that the circuit may be broken on overload without interfering with the service disconnecter mechanism and yet the same circuit breaker cooperates with the service disconnecter in such a manner that any attempt to reestablish the disconnected service will immediately cause the circuit breaker to be thrown out notwithstanding that the electrical load is normal. These functions are accomplished by employing as one element of my improved combination any suitable mechanism which employs principles preferably similar to those of a Westinghouse WK–50 circuit breaker. While a Westinghouse circuit breaker has been shown for purposes of illustrating the preferred form of my invention it is of course to be understood that other mechanisms can be used which employ one or all of the various principles of the Westinghouse device.

This device comprises an insulated base 35 having a U-shape stationary bracket 36 secured to base 35, the two legs of the bracket extending outwardly. A link 37 is pivoted at 38 within bracket 36 and carries an upwardly extending flat leaf spring 39, the outer end of which has a contact 40 for engagement with a stationary contact 41. To move link 37 outwardly and inwardly and accordingly open or close contacts 40, 41 there is provided a U-shaped hand operated lever 42 whose legs are pivoted at 43 to the opposite sides of bracket 36. A handle 44 with a suitable guard flange 45 extends through an opening 46 of a cover 47 which is removably secured to base 35 as by screws or other suitable means. The screws can, if desired, be passed from the rear of base 35 thereby preventing unauthorized removal of the cover as the base is also secured to the wall of the meter pan from the rear thereof. The switch lever 37 is controlled by hand lever 42 through toggle links 48 and 49 pivotally connected together at 50. Link 48 is pivotally connected at 51 to link 37 and link 49 is pivotally supported in a notch 52 of a normally stationary but releasable member 53. The toggle joint 50 is connected by springs 54 to a pin 55 passing through the two legs of lever 42. It is thus seen that when the axis of spring 54 is above pivot 52 the toggle links will assume the position shown thereby holding switch link 37 downwardly to close contacts 40, 41, whereas when handle 44 and lever 42 are moved downwardly so as to cause the axis of spring 54 to be on the lower side of pivot point 52 the spring tension will cause the toggle links to buckle downwardly thereby raising pivot 51 and accordingly link 37 to open contact 40, 41. With the contacts open it is only necessary to move handle 44 upwardly so as to reestablish the line of spring tension on the upper side of pivot point 52 thereby to reclose the contacts. The hand lever 42 is stopped in its extreme movements by legs 58 and 59 engaging the edges of lever 42.

With the switch closed, current flows through a contact 60, Fig. 1, a thermostat 61 in the form of a U-shape member as shown in Fig. 6, thence through link 53 which is latched on a lip 61' of the thermostat, thence through the metallic contacts of the various links to contact 40. There is also provided a suitable shunt 62 between contact 60 and frame 36 thereby controlling the amount of current flowing through thermostat 61. The thermostat is so arranged that upon occurrence of an overload its increased temperature resulting from such overload, causes the couple to bend downwardly thereby freeing or unlatching the free end 64 of link 53. This link is pivoted at 65 to frame 36 and is urged outwardly due to spring 54 acting through link 49 and notch 52. As a result link 53, the toggle links and link 37 move outwardly to open contacts 40, 41. As link 53 is thus moved there is moved simultaneously therewith an offset stop 67 forming a part of link 53. This stop member has a notch 68 for engagement with an inwardly extending abutment 69 formed as part of leg 59. Thus, link 53 can only move a limited amount which, however, is sufficient to open contacts 40, 41. In order to reclose the switch it is first necessary to move the hand lever 42 to its extreme downward position and in so doing an inwardly extending lug 70 will first engage an extension 71 of the stop lever 67 whereby continued downward movement of lever 42 will cause lever 53 to swing about its pivot 65 until end 64 passes into latched engagement with thermostat 61 after which hand lever 42 is moved upwardly to its upper extreme position thereby throwing the line of tension of spring 54 on the upper side of pivot point 52 to straighten the toggle links which are held in position by engaging the edge stop 67. It is thus seen that if the overload condition still exists when it is attempted to reclose contacts 40, 41, the switch will immediately reopen due to thermostat 61 again being heated above its normal temperature and thus unlatch lever 53. This operation will take place so quickly that there will not be any service connection established, the instantaneous closure of contacts 40, 41 not constituting such a service connection.

To coordinate the functions above described with automatic disconnection of the service when a given amount of current is used I provide means for releasing member 53 even though an overload current does not exist. In one embodiment this is accomplished by the provision of supplemental means having an electrically heated coiled resistance wire 80 suitably supported, for example in an insulated base 81 such as porcelain. This wire is covered by a relatively thin flat piece of perforated mica or other heat transmitting insulation and the whole structure is suitably supported in a metallic cover 82 which is secured in any suitable manner to the edge of the base 35. This heating element is disposed as close as possible to the thermostat 61 without interfering with the normal operation thereof and to facilitate the transmission of heat to the thermostat there is provided a small heat transferring wire 83 extending from the face of the mica to one edge of the thermostat 61 for sliding engagement therewith as shown in Fig. 6. Several wires 83 could be disposed around various portions of the thermostat 61 if desired.

The operation of my improved arrangement is as follows: The positive service wire 85 is connected to contact 60 of the circuit breaker and leads therefrom through wire 86 to the meter motor and thence out to the load line 87 which has a manually operated switch 88. The other side of the service wire 89 is connected through a neutral connection 90 disposed on the side of the circuit breaker base, thence leads through wire 91, meter 1 and back to the other load line 92. Current is supplied to the heating element 80 from the positive line 85 as by a wire 95 connected thereto on the meter side of the service breaker and is thence connected through wire 31 to contact 24. When hand 25 engages contact 24 the circuit is completed through the dial frame work with which shaft 26 has contact, and thence through wire 96 connected to neutral 91. Hence when a predetermined amount of current has been used so that hand 25 engages contact 24 heating element 80 will be heated and due to its close juxtaposition to thermostat 61 the latter will be heated above its normal temperature so as to unlatch lever 53 and open contacts 40, 41. The service is thereby automatically disconnected and at the same time the circuit for heating element 80 is likewise broken due to wire 95 being connected on the meter side of the circuit breaker. However, it is seen that should any attempt be made to reclose the circuit with hand 25 still engaging contact 24, the circuit for the heating element will be simultaneously reestablished and accordingly prevent thermostat 61 from holding lever 53 in its latched position. Hence it is seen that notwithstanding any efforts which might be made, for instance, by a customer, to reclose his circuit, it will be of no avail. However, should an overload occur so as to throw out the circuit breaker, the same may be reclosed either by the customer if the meter pan door is open or by the service man in case the pan door is locked as by a padlock or by the locking means hereinafter described, but in any case there will not be any interference with the automatic service connecter control.

To provide in combination with the supplemental means such as the heating element 80, a simplified means for permanently taking the meter out of service I connect wire 31 with the negative or neutral service wire 91 as by a switch 97 thereby permitting current flow through the heating element which will release the circuit breaker to open the service wires and at the same time open the circuit for the heating element. Switch 97 upon being closed will be sealed.

In case a customer should attempt to shunt around the meter and thereby steal current, the meter man can quickly determine whether such a condition exists or not simply by closing a test wire 98 connected across leads 85 and 91 and controlled by a suitable switch. Whether the circuit breaker is either in or out or whether or not hand 25 engages contact 24, closure of test wire 98 will cause a short circuit across the service wires if there is any shunt around the meter no matter how concealed or how remote from the meter the shunt may be. The fuses 98a will accordingly be blown out.

The modification of Fig. 7 shows a heating element wire 100 wrapped around the thermostat 61 and insulated therefrom by the use of thin mica sheets 101. These sheets may have suitable notches in their edges to receive, and prevent displacement of, the coils of wire and, if desired, one portion of a coil could actually engage an edge of the thermostat to increase the heat transfer thereto. Engagement of only a portion of one coil will avoid a short circuit between coils. In this form it is seen that the heating wire or element 100 would move with the thermostat and at the same time would provide a very compact arrangement and one which would be relatively inexpensive.

In the Fig. 9 modification thermostat 61 is opened by either a solenoid or relay coil 102 pulling upon a member 103 preferably pivoted at one end as at 104 while its other end may rest upon the thermostat but is preferably held slightly spaced therefrom by a light coil spring 103' thereby permitting a small hammer blow upon the thermostat to release link 53. Coil 102 will, of course, like the heating element 100, be connected to wires 95 and 31 as in the preferred form.

In the Fig. 10 form a vertically movable weight 105 is guided upon a small rod 106. This weight which preferably is cylindrical and has a tapered upper surface 107 is held in an upper position by a small latch bar 108 which may be pulled to an unlatched position by a solenoid or a pivoted armature of a relay, represented at 109 which is also connected to wires 95 and 31. Upon engagement of the measuring hand 25 with contact 24 coil 109 is energized to release latch 108 thereby allowing weight 105 to drop and strike the thermocouple or other suitable latch bar and move the same to an unlatching position. The weight is reset by being manually moved upwardly whereby cam surface 107 will engage and move latch 108 outwardly against a light spring which will force the latch bar inwardly beneath the weight when the weight has passed.

The Fig. 10a form has a weight 110 held in its upper position by a fusible link 111, the wires 95 and 31 being connected thereto as shown. When link 111 is blown the weight drops and thereafter the operation is the same as in the Fig. 10 form. Resetting of the weight necessitates, of course, insertion of a new fuse link.

The Fig. 11 form has a spring latch 112 initially tensioned so that when its outer end is free it moves to unlatched position. The outer end is normally held against movement by a fusible link 113 to which the wires 95 and 31 are connected or by a solenoid latch 114 as shown in Fig. 11a. The fusible link or latch 114 maintains spring 112 in latched position at all times except when the indicating hand 25 engages contact 24. In these forms it is seen that spring 112 cannot have any thermostatic function thereby allowing the circuit breaker to function only as an automatic service disconnecter.

A modified form of circuit breaker, shown in Fig. 12, if substituted for the preferred form, has the same circuits thereof and is adapted to have its switch unlatched by employing any of the various supplemental means and unlatching devices shown for the preferred form. The switch has a base 120 and a pivoted single switch lever 121 carrying a contact 40' for engagement with a suitably supported stationary contact 41' or when open to engage a short circuit contact 124 for establishing automatically the test circuit 98. One wire therefor is connected to the switch lever and the other wire to contact 124. A spring 125 constantly presses lever 121 toward open position to which it is prevented being moved by the thermostat 61. Thus the switch is adapted for both overload and service disconnecting.

The modified switch shown in Fig. 12a is the same as Fig. 12 except the switch has a plural part lever 121'. The two parts are pivotally connected and held together by lugs 126 and 127 projecting from each part and biased away from each other by a spring 128 interposed therebetween. Any suitable latch mechanism can be used to control separation of the link parts and for the sake of illustration there is shown a thermostat 130 secured to lug 127 and held in latching engagement with lug 126. If thermostat latch 61 is used for overload then thermostat 130 can be wrapped by a suitably insulated heating coil 100 to serve as the service disconnecter latch, or vice versa. Each of the forms in Figs. 12 and 12a have certain of the characteristics, if not all, of the preferred form. The contacts of Figs. 12 and 12a are given the same numbers.

Fig. 13 shows diagrammatically a horizontal section of a meter pan 131 in which is disposed a switch control relay or circuit breaker 132. In this form the hinged pan door 133 is adapted to be opened for inspection or operation of the inner mechanism as long as the customer is entitled to receive current but when the customer is not entitled to current it is desired to lock the door closed and thus prevent unauthorized manipulation of the switch and relay mechanism in an attempt to reestablish the service. To insure that the door is closed so that it can be locked in case the service is disconnected improved means are provided which necessitates closure of the door before the normal service circuit can be established. This cooperates with the automatic service disconnecter in that a knife switch 134, inserted in the live service wire, has a handle 135 projecting into an offset slot 136 formed in a bracket 137. This bracket is secured to the door and is curved concentrically about the door hinge axis. The switch is so disposed to the bracket and hinge that the switch handle always sufficiently remains within the bracket slot. As the door opens, a shoulder 138 of the slot engages handle 135 and pulls the switch open with the door. When the switch is opened its handle falls below the shoulder into the lower offset portion of the slot. When the door closes, shoulder 139 engages the handle and closes the switch with the door.

With the door closed and should contact 24 be engaged by hand 25 the relay 132 is energized to raise its pivotally supported armature 140 which carries with it a link 141 pivoted to the armature and to a horizontally disposed U-shape locking bar 142 that is pivoted at the ends of its legs. The cross bar of the U member is thus raised into a notch 143 of latch element 144 secured to the door thereby preventing opening thereof. To maintain the latch closed it is necessary to keep the relay energized at all times and to do this wire 95 is taken off the service wire side of the relay switch. The operation is otherwise the same as in my copending application Ser. No. 462,446, filed June 20, 1930.

In the modifications of Figs. 4 and 4a the control or initiating means for the circuit breaker utilizes any one of the meter dial indicating hands which will permit the given amount of current to be used without requiring a full revolution of the hand which is employed. If over a thousand and less than ten thousand kilowatts are to be the given value then it is best to use the thousand kilowatt hand whereas if the given value is to be less than a thousand then the hundredth's hand should be used, etc. To accomplish this an insulated disk 150 is secured coaxially of the hand shaft, say 15, to the front face 9 as by bolts 151 and insulating bushings 152, these bolts also holding a metallic disk 153 in yielding frictional engagement with a rotatable adjustable contact disk 154. This latter disk has secured thereto for rotation therewith an outwardly extending contact 24', which corresponds to contact 24, for engagement with the hand 7 thereby to establish a circuit from wire 31, through contact 24', hand 7 and the meter frame to wire 96 as on Fig. 1. To adjust contact 24' the periphery of disk 154 is provided with gear teeth adapted to be meshed with a small pinion 155 formed on the end of a key which is insertable through the sealable bushing 33. To suitably support the key during adjustment it is provided with a small pintle insertable within one or the other of openings 156 or 157, Fig. 4, depending upon whether hand 7 happens to be covering one or the other opening at the time of adjustment. It is of course to be understood that any of the various circuit breakers or supplemental controls therefor can be used with this type of initiating or control means and in the case of those forms of circuit breakers shown in Figs. 5, 12 and 12a the door of the meter pan can, if desired, be padlocked or otherwise normally fixedly closed.

Various changes can be made in the construction and operation of the several modifications without departing from the spirit of the invention as set forth in the appended claims.

I claim:

1. An automatic service disconnecting mechanism comprising, in combination, an integrating watthour meter for a circuit, a circuit breaker adapted to open automatically when once initiated, means controlled by said meter for effecting said initiation automatically when a predetermined amount of current in watthours is consumed, said meter controlled means being adapted to be reset to permit if desired use of current only to the extent of said predetermined amount irrespective of whether such an amount has been previously fully used, and means normally operative to inhibit resetting of said meter controlled means whereby reclosing of said circuit breaker is prevented after said automatic means effects said initiation.

2. An automatic service disconnecting mechanism comprising, in combination, an integrating watthour meter for a circuit, a circuit breaker adapted to open automatically when once initiated, means controlled by said meter for effecting said initiation automatically when a predetermined amount of current in watt hours is consumed and being rendered inoperative when said circuit breaker opens, said meter controlled means being adapted to be reset to permit if desired use of current only to the extent of said predetermined amount irrespective of whether such an amount has been previously fully used, and means normally operative to inhibit resetting of said meter controlled means whereby reclosing of said circuit breaker is prevented after said automatic means effects said initiation.

3. An automatic service disconnecting mechanism comprising, in combination, an integrating watthour meter for a circuit, a circuit breaker adapted to open automatically when once initiated, means controlled by said meter, and being operative only when said circuit breaker is closed, for effecting said initiation automatically when a predetermined amount of current in watthours is consumed, said meter controlled means being adapted to be reset to permit if desired use of current only to the extent of said predetermined amount irrespective of whether such an amount has been previously fully used, and means normally operative to inhibit resetting of said meter controlled means whereby reclosing of said circuit breaker is prevented after said automatic means effects said initiation.

4. An automatic service disconnecting mechanism comprising, in combination, an integrating watthour meter for a circuit, an overload circuit breaker adapted to open automatically when once initiated, means controlled by said meter for also initiating opening of said circuit breaker but doing so independently of an overload condition.

5. An automatic service disconnecting mechanism comprising, in combination, an integrating watthour meter for a circuit, a thermostatically controlled circuit breaker adapted to open automatically when once initiated, means controlled by said meter for effecting actuation of the thermostat of said circuit breaker to initiate opening thereof, said meter controlled means having provision for being reset without necessarily closing said circuit breaker, and means normally operative to inhibit resetting of said meter controlled means whereby reclosing of said circuit breaker is prevented after said automatic means effects said initiation.

6. An automatic service disconnecting mechanism comprising, in combination, an integrating watthour meter for a circuit, a thermostatically controlled circuit breaker adapted to open automatically when once initiated, means controlled by said meter for effecting the necessary heating of the thermostatic control of said circuit breaker so as to initiate opening thereof, said meter controlled means having provision for being reset without necessarily closing said circuit breaker, and means normally operative to inhibit resetting of said meter controlled means whereby reclosing of said circuit breaker is prevented after said automatic means effects said initiation.

7. An automatic service disconnecting mechanism comprising, in combination, an integrating watthour meter for a circuit, a thermostatically controlled circuit breaker adapted to open automatically when once initiated, means controlled by said meter for effecting the necessary heating of the thermostatic control of said circuit breaker so as to initiate opening thereof automatically when a predetermined amount of current has been used, means whereby said thermostatic action is also effected upon an overload in said circuit, and means whereby said circuit breaker is adapted to be reset at any time when initiated by overload but unable to be normally reset when actuated upon consumption of said predetermined amount of current.

8. An automatic service disconnecting mechanism comprising, in combination, a circuit, an integrating watthour meter therefor having gear operated indicating mechanism, a switch for said circuit, means including a shaft carrying a gear meshing with one of said meter gears for effecting opening of said switch automatically in accordance with a predetermined condition, said meter controlled means being adapted to be reset to permit if desired use of current only to the extent of said predetermined amount irrespective of whether such an amount has been previously fully used, and means normally operative to inhibit resetting of said meter controlled means whereby reclosing of said switch is prevented after said automatic means effects said initiation.

9. An automatic service disconnecting mechanism comprising, in combination, a circuit, an integrating watthour meter therefor having gear operated indicating mechanism, a switch for said circuit, means for automatically opening said switch upon load, means including a shaft carrying a gear meshing with one of said meter gears for effecting opening of said switch automatically in accordance with a predetermined condition, said shaft being axially movable so as to disengage said gears and permit rotatable adjustment of the shaft independently of said meter whereby said predetermined condition may be variably controlled, means whereby said switch may be reclosed at any time after being opened by overload, and sealed means normally operative to prevent reestablishment of the disconnected circuit when said switch is opened by said predetermined condition.

10. An automatic service disconnecter comprising, in combination, a circuit, an integrating watthour meter therefor having a transparent cover, a switch for said circuit, means controlled by said meter for opening said switch automatically when a predetermined quantity of current has been used in said circuit, said means having a movable initiating element visible through said cover whereby the quantity of unused current may be visibly determined, means whereby said switch may be reclosed at any time after being opened by overload, and sealed means normally operative to prevent reestablishment of the disconnected circuit when said switch is opened by said predetermined condition.

11. An automatic service disconnecter comprising, in combination, a circuit, an integrating watthour meter therefor having a transparent cover, a switch for said circuit, and means controlled by said meter for opening said switch automatically when a predetermined quantity of current has been used in said circuit, said means having a movable initiating element visible through said cover whereby the quantity of unused current may be visibly determined, and normally sealed means whereby said initiating element is accessible through said cover for resetting.

12. An automatic service disconnecting mechanism comprising, in combination, an integrating watthour meter for a circuit, an overload circuit breaker adapted to open automatically when once initiated and normally operative and accessible for reclosure when opened by an overload condition, means controlled by said meter for also initiating opening of said circuit breaker but doing so independently of an overload condition, and means for normally inhibiting resetting of said meter controlled means, whereby said circuit breaker is always adapted to be reclosed in case it is opened by an overload condition but in case the circuit is opened by meter initiation then said circuit breaker is closable only by an authorized person.

13. An automatic service disconnecting mechanism comprising, in combination, an integrating watthour meter for a circuit, an overload circuit breaker adapted to open automatically when once initiated, means controlled by said meter for also initiating opening of said circuit breaker, and means whereby said circuit breaker is automatically locked out when actuated by said meter control but is adapted to be reclosed when actuated by overload.

RET O. HAMILL.